United States Patent
Droms et al.

(10) Patent No.: US 7,937,494 B2
(45) Date of Patent: May 3, 2011

(54) METHODS AND APPARATUS FOR PROCESSING A DHCP REQUEST USING RULE-BASED CLASSIFICATION

(75) Inventors: Ralph Droms, Westford, MA (US); Richard Johnson, Santa Barbara, CA (US); Matthew King, Headley Down (GB); Richard Pruss, Marcoola (AU)

(73) Assignee: Cisco Technology, Inc., San Jose, CA (US)

( * ) Notice: Subject to any disclaimer, the term of this patent is extended or adjusted under 35 U.S.C. 154(b) by 1349 days.

(21) Appl. No.: 11/218,128

(22) Filed: Sep. 1, 2005

(65) Prior Publication Data

US 2007/0061484 A1    Mar. 15, 2007

(51) Int. Cl.
    *H04L 12/56* (2006.01)
(52) U.S. Cl. .................. 709/245; 709/220; 709/208
(58) Field of Classification Search .......... 709/245
    See application file for complete search history.

(56) References Cited

U.S. PATENT DOCUMENTS

| | | | | |
|---|---|---|---|---|
| 6,496,511 | B1* | 12/2002 | Wang et al. ............. | 370/401 |
| 7,039,035 | B2 | 5/2006 | Droms et al. ............ | 370/338 |
| 7,051,089 | B1 | 5/2006 | Johnson et al. .......... | 709/220 |
| 2004/0229627 | A1* | 11/2004 | Malladi et al. ......... | 455/452.1 |
| 2005/0252957 | A1 | 11/2005 | Howarth et al. ......... | 235/375 |
| 2005/0252970 | A1 | 11/2005 | Howarth et al. ......... | 235/451 |
| 2005/0253717 | A1 | 11/2005 | Howarth et al. ......... | 340/572.1 |
| 2005/0253718 | A1 | 11/2005 | Droms et al. ........... | 340/572.1 |
| 2005/0253722 | A1 | 11/2005 | Droms et al. ........... | 340/572.1 |
| 2005/0259654 | A1* | 11/2005 | Faulk, Jr. ............... | 370/392 |
| 2005/0264420 | A1 | 12/2005 | Vogel et al. ............. | 340/572.1 |
| 2006/0239273 | A1* | 10/2006 | Buckman et al. ........ | 370/395.41 |
| 2006/0248229 | A1* | 11/2006 | Saunderson et al. ..... | 709/245 |
| 2007/0180120 | A1* | 8/2007 | Bainbridge et al. ...... | 709/226 |

OTHER PUBLICATIONS

Droms, R., "RFC 2131 (RFC2131)," http://www.faqs.org/rfcs/rfc2131.html, published Mar. 1997, accessed Apr. 22, 2006.

Alexander, S., et al., "RFC 2132 (RFC2132)," http://www.faqs.org/rfcs/rfc2132.html, published Mar. 1997, accessed Apr. 22, 2006.

Patrick, M., "RFC 3046 (RFC3046)," http://www.faqs.org/rfcs/rfc3046.html, published Jan. 2001, accessed Apr. 22, 2006.

* cited by examiner

*Primary Examiner* — Jeffrey Pwu
*Assistant Examiner* — Sulaiman Nooristany
(74) *Attorney, Agent, or Firm* — BainwoodHuang

(57) ABSTRACT

An improved technique for processing a DHCP request from a DHCP client device is performed in a data communications device of a network (e.g., performed in a router). The technique involves receiving the DHCP request from the DHCP client device, evaluating a set of rules in response to the DHCP request to obtain a rule-based classification result, and outputting a DHCP response in response to the rule-based classification result. In some arrangements, a policy manager which is external to the data communications device plays a role in the classification process (e.g., dynamic updating of the set of rules, responding to individual queries from the data communications device when generating the rule-based classification result, etc.). Such improvements over conventional DHCP approaches enables improved flexibility and coordination of the DHCP process.

21 Claims, 4 Drawing Sheets

METHODS AND APPARATUS FOR PROCESSING A DHCP REQUEST USING RULE-BASED CLASSIFICATION

BACKGROUND

The Dynamic Host Configuration Protocol (DHCP) enables assignment of dynamic Internet Protocol (IP) addresses to devices on a network. Such dynamic assignment of IP addresses simplifies network administration. In particular, there is no need for an administrator to manually manage and coordinate unique IP addresses among the devices. Rather, with the use of DHCP, such management and coordination occurs in an automated manner.

Typically, when a DHCP client (e.g., a networked computer) is first switched on, the DHCP client sends a broadcast packet on the network with a DHCP request. A DHCP server on the network then detects this packet, and assigns an IP address to that DHCP client from a pool of available IP addresses for a "leased" amount of time. When the lease is about to expire, the DHCP client may renew the lease for that IP address. However, if the DHCP server does not hear from the DHCP client beyond the expiry of the lease period, the DHCP server typically places the IP address back into the pool ready to be re-used.

Some DHCP servers are equipped to accommodate DHCP requests from a device that has been statically pre-assigned an IP address. That is, the DHCP server has been configured to assign a pre-assigned IP address to the device, rather than assigning an IP address to the device from a pool of available IP addresses. If the DHCP server receiving the DHCP request from the device authenticates the DHCP client (e.g., by MAC address matching), the DHCP server assigns the pre-assigned IP address to the DHCP client. However, if the DHCP server determines that the DHCP server does not have a pre-assigned IP address for the device, the DHCP server dynamically assigns an IP address to the device from a pool of IP addresses that area available for dynamic assignment.

SUMMARY

The above-described conventional approaches for handling DHCP requests are capable of being improved upon. For example, it is possible to broaden the capability of assigning IP addresses in a rule-based manner for improved coordination and greater flexibility.

Various embodiments of the present invention are directed to techniques for processing DHCP requests which involve classifying the DHCP requests based on a set of rules, and providing DHCP responses and other actions based on such classification. Such processing (i) enables rule-based processing of DHCP requests based on information in the DHCP messages and other state in the network and (ii) allows for dynamic changing of the rules for improved address management and control.

One embodiment is directed to a technique for processing a DHCP request from a DHCP client device which is performed in a data communications device of a network (e.g., performed in a router). The technique involves receiving the DHCP request from the DHCP client device, evaluating a set of rules in response to the DHCP request to obtain a rule-based classification result, and outputting a DHCP response in response to the rule-based classification result. In some arrangements, a policy manager which is external to the data communications device plays a role in the classification process (e.g., dynamic updating of the set of rules, responding to individual queries from the data communications device when generating the rule-based classification result, etc.). Such improvements over conventional DHCP approaches enables improved flexibility and coordination of the DHCP process.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Embodiments of the present invention are directed to techniques for processing DHCP requests which involve classifying the DHCP requests based on a set of rules, and providing DHCP responses and other actions based on such classification. Such processing (i) enables rule-based processing of DHCP requests based on information in the DHCP messages and other state in the network and (ii) allows for dynamic changing of the rules for improved address management and control.

Figure 1:
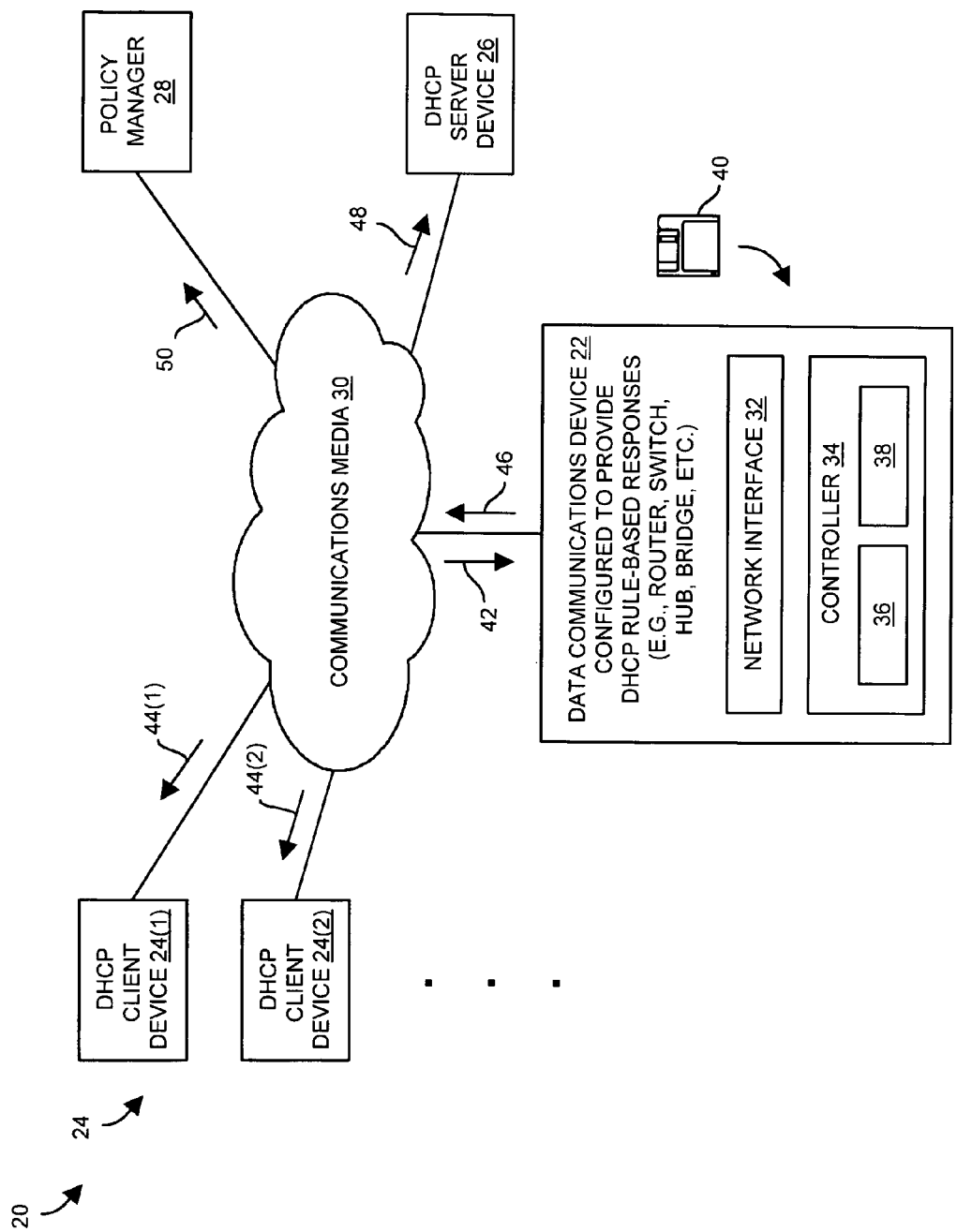
FIG. 1 is a block diagram of a system which is configured to process DHCP requests using rule-based classification.

FIG. 1 shows a system 20 which is suitable for use by the invention. The system 20 includes a data communications device 22, a set of DHCP client devices 24(1), 24(2), . . . (collectively, DHCP client devices 24), a DHCP server device 26, a policy manager 28, and communications media 30. The communications media 30 includes multiple network hops which interconnect the devices 22, 24, 26, 28 to enable robust and reliable communications therebetween. That is, the communications media 30 may include hardwired devices (e.g., routers, switches, bridges, hubs, etc.), cables, wireless devices, combinations thereof, and so on. Additionally, the communications media 30 may take a variety of topologies, e.g., backbone, hub-and-spoke, rings or loops, irregular topologies, combinations thereof, etc.

The data communications device 22 includes a network interface 32 and a controller 34. The network interface 32 is configured to handle communications between the data communications device 22 and the various other devices 22, 24, 26, 28 through the communications media 30. The controller 34 is configured to perform DHCP server operations in accordance with a set of rules 36 for improved management and coordination of IP addresses.

In some arrangements, the controller 34 includes a processor and memory in order to execute a software application 38 to enable the controller 34 to perform the above-described DHCP rule-based operation. In these arrangements, one or more computer program products 40 deliver the application 38 to the data communications device 22 from an external source. Although the computer program product 40 is illustrated as a diskette by way of example only, a variety of storage media are suitable for use (e.g., a set of CD-ROMs, tapes, memory cards or sticks, combinations thereof, etc.).

During operation of the system 20, the DHCP client devices 24 are configured to send DHCP requests 42 to the data communications device 22 through the communications media 30 in order to obtain IP addresses 44 or renew leases on already assigned IP addresses 44, e.g., see the IP addresses 44(1), 44(2) en route to the respective DHCP client devices 24(1), 24(2). The controller 34 of the data communications device 22 is configured to individually receive each DHCP request 42 and evaluate the rules 36 according to (i) contents of that DHCP request 42 and (ii) state information within the data communications device 22. The controller 34 then uses result of such an evaluation to determine whether to (i) process that DHCP request 42 without the help of the external DHCP server device 26 or (ii) forward that DHCP request 42 to the external DHCP server device 26.

In contrast to conventional approaches which are only equipped to respond to a DHCP request for an IP address by (i) assigning a static IP address in response to a MAC address match or otherwise (ii) assigning an IP address to the device from a pool of IP addresses that are available for dynamic assignment, the data communications device 22 provides robust rule-based evaluation of each DHCP request 42 regardless of whether the device sending the DHCP request 42 has been pre-assigned an IP address or is dynamically assigned an IP address. In either situation, the data communications device 22 operates based on the application of the set of rules 36 and thus has the capability to handle processing of the DHCP request 42 (i) completely locally (i.e., sending, as a DHCP response 46, an IP address 44 to a requesting DHCP client device 24), or (ii) with intervention by the DHCP server 26 or the policy manager 28. In this latter situation, the data communications device 22 sends, as the DHCP response 46, a message 48 to the DHCP server 26 or a message 50 to the policy manager 28, which then provides control over address assignment).

Moreover, such rule-based operation allows for dynamic modification of the set of rules 36 (i.e., during operation) for on-the-fly reconfiguration for enhanced flexibility. The set of rules 36 may encompass information about the state of the network in which the DHCP server, DHCP client and other components are operating as well as the contents of the DHCP message received from the DHCP client. Such dynamic updating of the rules 36 is unachievable using a conventional MAC address matching scheme. Further details of the data communications device 22 will now be provided with reference to FIG. 2.

Figure 2:
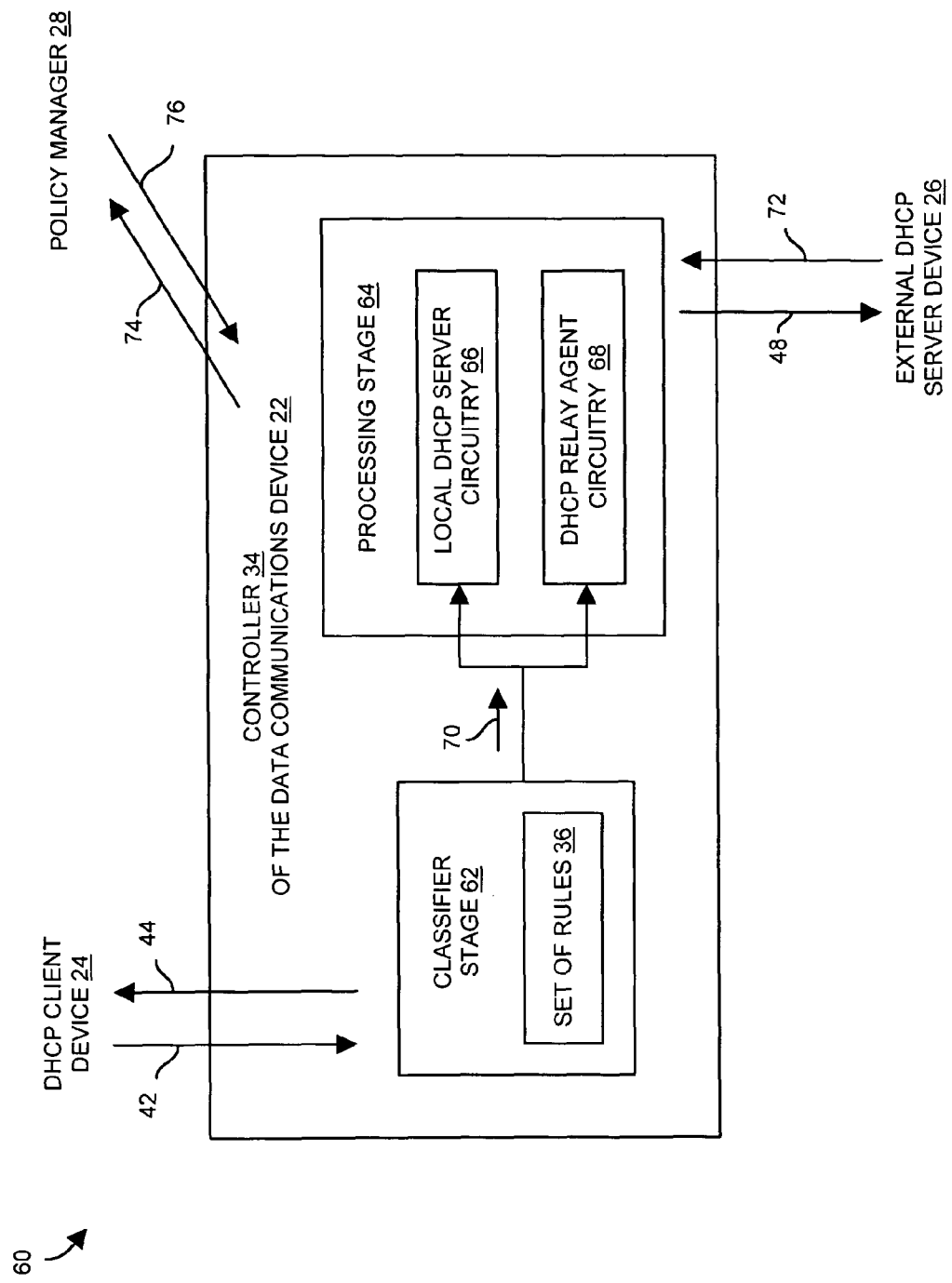
FIG. 2 is a block diagram of a data communications device of the system of FIG. 1.

FIG. 2 shows particular details 60 of the controller 34 of the data communications device 22 and its interaction with various other devices 22, 26, 28 of the system 20. As shown in the details 60, the controller 34 includes a classifier stage 62 and a processing stage 64. The classifier stage 62 utilizes the set of rules 36. The processing stage 64 includes local DHCP server circuitry 66 and DHCP relay agent circuitry 68.

When the network interface 32 of the data communications device 22 receives a DHCP request 42 from a DHCP client device 24 (also see FIG. 1), the network interface 32 conveys the DHCP request 42 to the classifier stage 62. The classifier stage 62 then classifies the DHCP request 42 into one of multiple classes based on the set of rules 36 to obtain a rule-based classification result 70. The classifier stage 62 generates this rule-based classification result 70 from an evaluation of the DHCP request 42 (e.g., based on whether the requesting DHCP client device 24 is a general purpose computer, an Option 60 type device, etc.), state information of the data communications device 22 (e.g., whether any addresses are available in particular address pools) and state information about the network in which the DHCP server, DHCP client and other components are operating. The classifier stage 62 then provides the rule-based classification result 70 to the processing stage 64.

When the processing stage 64 receives the rule-based classification result 70, the value of the rule-based classification result 70 determines whether the processing stage 64 either operates as a DHCP server or communicates with the external DHCP server 28 (also see FIG. 1) to satisfy the DHCP request 42. In particular, when the rule-based classification result 70 has a first value (e.g., HANDLE_LOCALLY), the local DHCP server circuitry 66 of the processing stage 64 operates as a DHCP server by providing, as the DHCP response 46, an IP address 44 to the DHCP client device 24. During this time, the DHCP relay agent circuitry 68 disregards the DHCP request 42 (i.e., the DHCP relay agent circuitry 68 does not forward the DHCP request 42 to another device) thus enabling the processing stage 64 to fulfill the DHCP request 42 without assistance from the external DHCP server device 26. In addition, the processing stage 64 may cause other actions to be taken by other components of the network, for example, data communications device 22 may deny all network access to the DHCP client 24(1).

For example, suppose that the DHCP request 42 is received from a device that does not have a statically assigned IP address and further suppose that the classifying stage 62 generates the rule-based classification result 70 with the first value (e.g., HANDLE_LOCALLY) in response to this DHCP request 42. The local DHCP server circuitry 64 responds by selecting an available IP address from an appropriate pool of IP addresses and sending that selected IP address 44 to the DHCP client device 24 in the form of a DHCP reply 46 (also see FIG. 1).

However, now suppose that another DHCP request 42 is received from a device that does not have a statically assigned IP address and further suppose that the classifying stage 62 generates the rule-based classification result 70 with a second value (e.g., HANDLE_REMOTELY) in response to this other DHCP request 42. Here, the DHCP relay agent circuitry 68 provides, as the DHCP response 46, a request message 48 to the DHCP server device 26 through the communications media 30. Essentially, this involves the DHCP relay agent circuitry 68 forwarding the DHCP request 42 to the external DHCP server device 26 through the network interface 32 and the communications media 30. During this time, the local DHCP server circuitry 66 disregards the DHCP request 42. The request message 48 from the DHCP relay agent circuitry 68 directs the DHCP server device 26 to assign an IP address 44 to the DHCP client device 24.

When the external DHCP server device 26 assigns this IP address 44 to the DHCP client device 24, the DHCP server device 26 communicates the IP address 44 back to the data communications device 22 in the form of an answer message 72 which, in turn, receives the answer message 72 and sends the IP address 44 in the form of a DHCP reply 46 back to the DHCP client device 24. Such a sequence enables the data communications device 22 to be the direct source of all IP address assignments.

As will be explained in further detail shortly, the controller 34 of the data communications device 22 is capable of communicating with the policy manager 28 for flexible operation. In particular, the controller 34 is capable of sending signals 74 to the policy manager 28 through the network interface 32 and the communications media 30 (also see FIG. 1). Similarly, the controller 34 is capable of receiving signals 76 from the policy manager 28 through the network interface 32 and the communications media 30. The exchange of such signals 74, 76 enable the policy manager 28 to influence the operation of the data communications device 22. Further details of the set of rules will now be provided with reference to FIG. 3.

Figure 3:
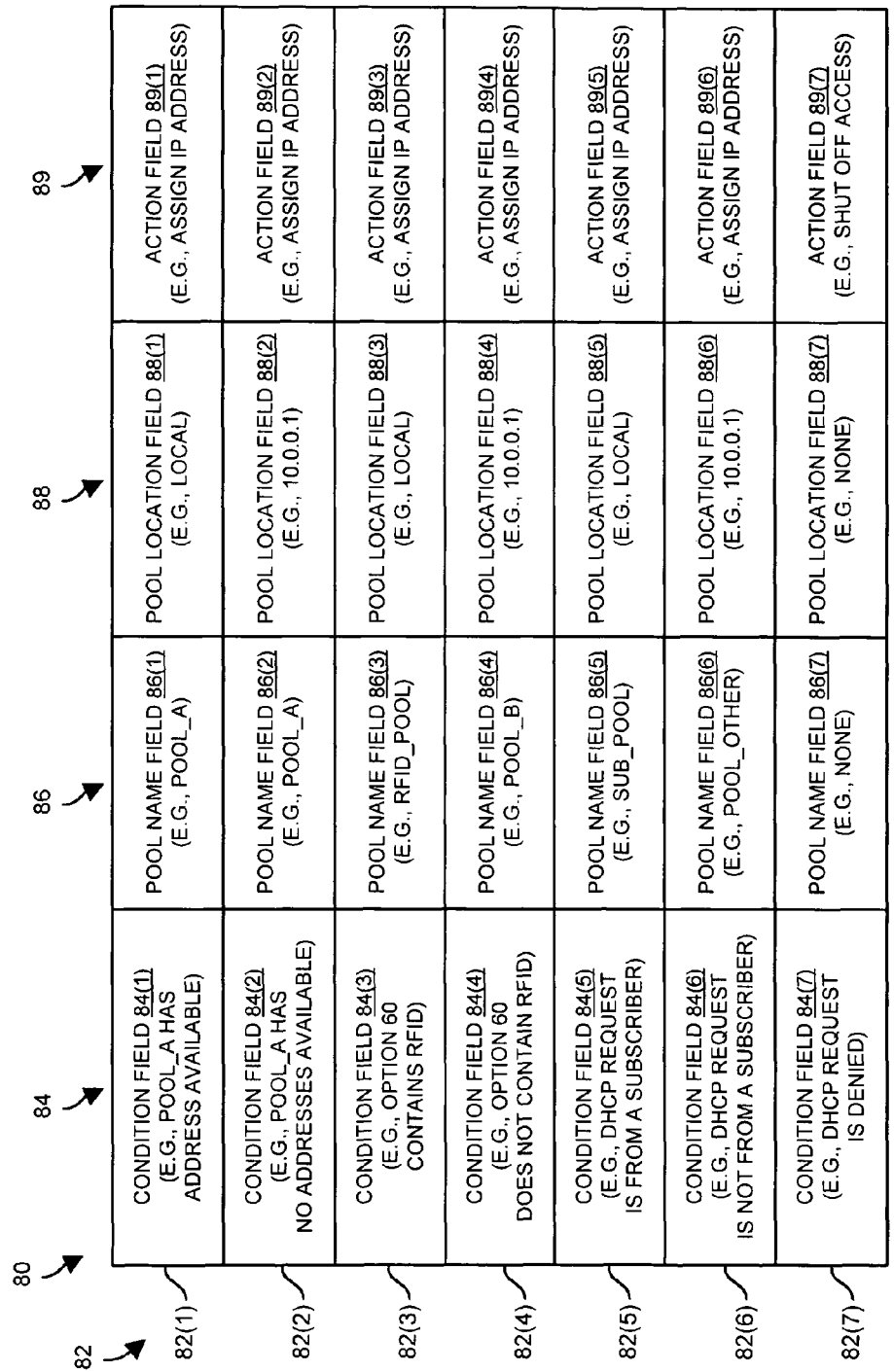
FIG. 3 is a table which is utilized by the data communications device of FIG. 2.

FIG. 3 shows, by way of example, a table 80 having multiple rule entries 82(1), 82(2), 82(3), 82(4), 82(5), 82(6), 82(7), . . . (collectively, rule entries 82). The table 80 is well-suited for use as the set of rules 36 by the data communications device 22 (also see FIGS. 1 and 2). As shown in FIG. 3, each entry 82 includes a condition field 84, a pool name field 86, a pool location field 88 and an action field 89.

The contents of the condition field 84 of each rule entry 82 defines a particular condition for that rule entry 82. Essentially, a rule condition is a set of tests (i.e., one or more tests) to be evaluated against contents of the DHCP requests 42.

The contents of the pool name field 86 of each rule entry 82 defines a particular pool for that rule entry 82. This is the pool from which the DHCP request 42 is to be serviced.

The contents of the pool location field 88 of each rule entry 82 defines a particular location for the particular pool for that rule entry 82 (e.g., "LOCAL" if the pool resides within the data communications device 22, an IP address if the pool resides in an external device, etc.). The particular location identifies the DHCP server the manages the pool identified by that rule entry 82. Further details will now be provided with reference to the following example.

The contents of the action field 89 of each rule entry 82 defines a particular action to be taken for that rule entry 82 (e.g., assign an IP address, shut off access, etc.). Accordingly, the rule entries 82 are capable of going beyond simply assigning IP addresses (e.g., affecting quality of service, blocking traffic for security reasons, and so on).

For illustration purposes, suppose that the controller 34 maintains a pool, which is called "POOL_A", of available IP addresses for Personal Computer (PC) style devices, and that there is one remaining IP address in that pool. Additionally, suppose that the controller 34 maintains another pool, which is called "RFID_POOL", of available IP addresses for Option 60 style devices containing an RFID, and that there is one remaining IP address in that pool. Furthermore, suppose that the controller 34 maintains yet another pool, which is called "SUBSCRIBER_POOL", of available IP addresses for service subscribers, and that there is one remaining IP address in that pool. Also, suppose that the external DHCP server device 26 maintains a reserve pool of available IP addresses for PC-style devices which is also called "POOL_A", a reserve pool of available IP addresses for Option 60 style devices not containing an RFID which is called "POOL_B" and a reserve pool of available IP addresses for non-subscribers which is called "POOL_OTHER".

Further suppose that the set of rules 36 utilized by the data communications device 22 is as shown in FIG. 3. That is, the contents of field 84(1) defines a "POOL_A HAVING AN ADDRESS AVAILABLE CONDITION", the contents of field 86(1) defines "POOL_A", the contents of field 88(1) defines "LOCAL", and the contents of field 89(1) defines "ASSIGN IP ADDRESS". Additionally, the contents of field 84(2) defines a "POOL_A HAS NO ADDRESS AVAILABLE CONDITION", the contents of field 86(2) defines "POOL_A", the contents of field 88(2) defines "10.0.0.1" (the IP address of the external DHCP server device 26), and the contents of field 89(2) defines "ASSIGN IP ADDRESS". Furthermore, the contents of field 84(3) defines a "OPTION 60 CONTAINS RFID", the contents of field 86(3) defines "RFID_POOL", the contents of field 88(3) defines "LOCAL", and the contents of field 89(3) defines "ASSIGN IP ADDRESS". Also, the contents of field 84(4) defines a "OPTION 60 DOES NOT CONTAIN RFID", the contents of field 86(4) defines "POOL_B", the contents of field 88(4) defines "10.0.0.1", and the contents of field 89(4) defines "ASSIGN IP ADDRESS", and so on.

Additionally, the contents of field 84(5) defines "DHCP REQUEST IS FROM A SUBSCRIBER", the contents of field 86(5) defines "SUBSCRIBER_POOL", the contents of field 88(5) defines "LOCAL" and the contents of field 89(4) defines "ASSIGN IP ADDRESS". Also the contents of field 84(6) defines "DHCP REQUEST IS NOT FROM A SUBSCRIBER", the contents of field 86(6) defines "OTHER_POOL", the contents of field 88(6) defines "10.0.0.1" and the contents of field 89(6) defines "ASSIGN IP ADDRESS". Additionally, the contents of field 84(7) defines "DHCP REQUEST IS DENIED", the contents of field 86(7) are undefined, the contents of field 88(7) are undefined, and the contents of field 89(7) defines "SHUT OFF ACCESS".

During operation of the system 20, suppose that the DHCP client device 24(2) is a PC-style device which is switched on and broadcasts a DHCP request 42 over the communications media 30 (also see FIG. 1). The data communications device 22 handles the DHCP request 42. In particular, the classifier stage 62 acquires the DHCP request 42 through the network interface 32 (FIG. 1), and applies the set of rules 36 (FIG. 3). Specifically, the classifier stage 62 evaluates the set of rules 36 in order from entry 82(1) to entry 82(2), and so on.

Accordingly, the classifier stage 62 (FIG. 3) attempts to evaluate the rule of entry 82(1) in view of the DHCP request 42 (which indicates that the DHCP client device 24(2) is a PC-style device) and the state information of the data communications device 22 (in which there is an available address remaining in POOL_A). Accordingly, the classifier stage 62 determines that the rule 36 defined by rule entry 82(1) is appropriate and outputs a rule-based classification result 70 with a value (e.g., HANDLE_LOCALLY) that directs the local DHCP server circuitry 66 to assign an available IP address from POOL_A. In response, the local DHCP server circuitry 66 performs the action defined in the action field 89(1) of the rule 82(1). In particular, the local DHCP server circuitry 66 assigns an IP address by sending a DHCP response 44 to the DHCP client 24(2) with an IP address selected from POOL_A.

Now suppose that the DHCP client device 24(1) is switched on and broadcasts another DHCP request 42 over the communications media 30 (also see FIG. 1). The data communications device 22 handles this other DHCP request 42 as well. In particular, the classifier stage 62 evaluates the rules 36 defined by entries 82 in order, i.e., entry 82(1) followed by entry 82(2), and so on. However, now suppose that the DHCP client 24(1) is another PC-style device but that there are no longer any available IP addresses available in POOL_A of the data communications device 22. In this situation, when the classifier stage 62 evaluates the rule 36 of entry 82(1), the classifier stage 62 determines that entry 82(1) in not appropriate (i.e., there are no available addresses left in POOL_A). The classifier stage 62 then evaluates the rule 36 of entry 82(2) and determines that the condition defined by entry 82(2) is appropriate, i.e., that the DHCP request 42 is for an IP address from POOL_A and that POOL_A has no address available. Thus, the classifier stage 62 determines that the location of available addresses is at IP address "10.0.0.1" (i.e., the external DHCP server device 26, also see FIGS. 1 and 2) and outputs a rule-based classification result 70 with a value (e.g., HANDLE_REMOTELY) that directs the DHCP relay agent circuitry 68 to forward a request message 48 containing the DHCP request 42 to the external DHCP server device 26. The DHCP relay agent circuitry 68 responds by performing the action defined by the action field 89(2) of the selected entry 82(2), i.e., configuring the request message 48 to ask the external DHCP server device 26 to assign an IP address from POOL_A of available IP addresses. In turn, the external DHCP server device 26 responds to this request message 48 by assigning an available IP address 72 from its POOL_A.

The data communications device 22 is well-equipped to perform additional rule-based classification as well (e.g., to handle DHCP requests for Option 60 style devices). Such operation enables the data communications device 22 to manage a variety of IP address assignments in a robust and well-managed manner.

Furthermore, the data communications device 22 is more flexible than a conventional DHCP server that performs simple MAC address matching to determine whether to respond to a device with a static pre-assigned IP address. Rather, with the data communications device 22, the rules 36 can be configured to enable the data communications device 22 to perform other operations such as performing smart IP address assignments and taking security actions.

Along these lines, suppose that a DHCP client device 24 submits a DHCP request 42 and the device 24 has been statically assigned an IP address. The controller 34 of the data communications device 22 is capable of being configured to handle this DHCP request 42 in one of a variety of ways. For example, if the controller 34 determines that the requesting DHCP client device 24 is a subscriber and that the (e.g., see rule entry 82(5)) device 24 has been statically assigned an IP address, the controller 34 can assign that IP address to the requesting DHCP client device 24. Additionally, if the controller 34 determines that the requesting DHCP client device 24 is not a subscriber (e.g., see rule entry 82(6)), the controller 34 can direct the external DHCP server device 26 to assign an IP address to the requesting DHCP client device 24 from another pool (e.g., "POOL_OTHER"). Furthermore, the controller 34 may determine that the DHCP client device 24 requires some action other than simply assigning or not assigning an address (e.g., taking a QoS action, taking a security action, etc.). For example, based on other state information of the network, the controller 34 may determine that the requesting DHCP client device 24 is an intruding device and shutting off access from this source (e.g., closing a port, etc.) and thus block all further traffic from the requesting DHCP client device 24 (e.g., see rule entry 82(7)). The rule-based operation of the controller 34 provides flexibility to configure such operation, as well as change such operation dynamically (e.g., by modifying the rule entries 82).

It should be understood that the classifier stage 62 is capable of deferring the decision as to whether the processing stage 64 locally processes the DHCP request 42 or sends the DHCP request 42 out to the external DHCP server device 26 to the policy manager 28. That is, some of the rules 36 direct the classifier stage 62 to send a signal 74 to the policy manager 28 asking that the policy manager 28 determine the value of the rule-based classification result 70. The policy manager 28 responds to such a signal 74 with a return signal 76 indicating whether the rule-based classification result 70 should have the first value for local processing of the DHCP request 42 by the local DHCP server circuitry 66, or the second value for remote processing of the DHCP request 42 through the DHCP relay agent circuitry 68.

It should be further understood that the set of rules 36 are capable of being updated while the data communications device 22 performs rule-based DHCP operations in a normal operating mode. In some arrangements, an administrator is capable of dynamically changing one or more of the rules 36 by operating an input/output terminal connected locally to the data communications device 22. In some arrangements, an external device such as the policy manager 28 is capable of dynamically updating one or more of the rules 36 (e.g., also illustrated by the arrow 76 in FIG. 3). Such operation provide maximum flexibility to the operation of the data communications device 22 as a DHCP server.

When either an administrator or the policy manager 28 changes the set of rules 36 (FIGS. 1 and 2), the administrator or the policy manager 28 simply modifies the contents of one or more of the fields 84, 86, 88 of the rule entries 82 of the table 80 (FIG. 3). Such modification is capable of occurring dynamically, i.e., in real-time while the system 20 is in a normal operating mode and capable of attending to DHCP requests 42. In particular, the policy manager 28 may evaluate the state information of the device 22 and operating conditions around the data communications device 22, and then adjust or update the set of rules 36 based on such information. For example, if the bandwidth through the data communications device 22 (e.g., a router) is low, the policy manager 28 may change the set of rules 36 to enable the data communications device 22 to play a greater role in address assignment and thus offload DHCP server operations from an overburdened device in the system 20. Further details will now be provided with reference to FIG. 4.

Figure 4:
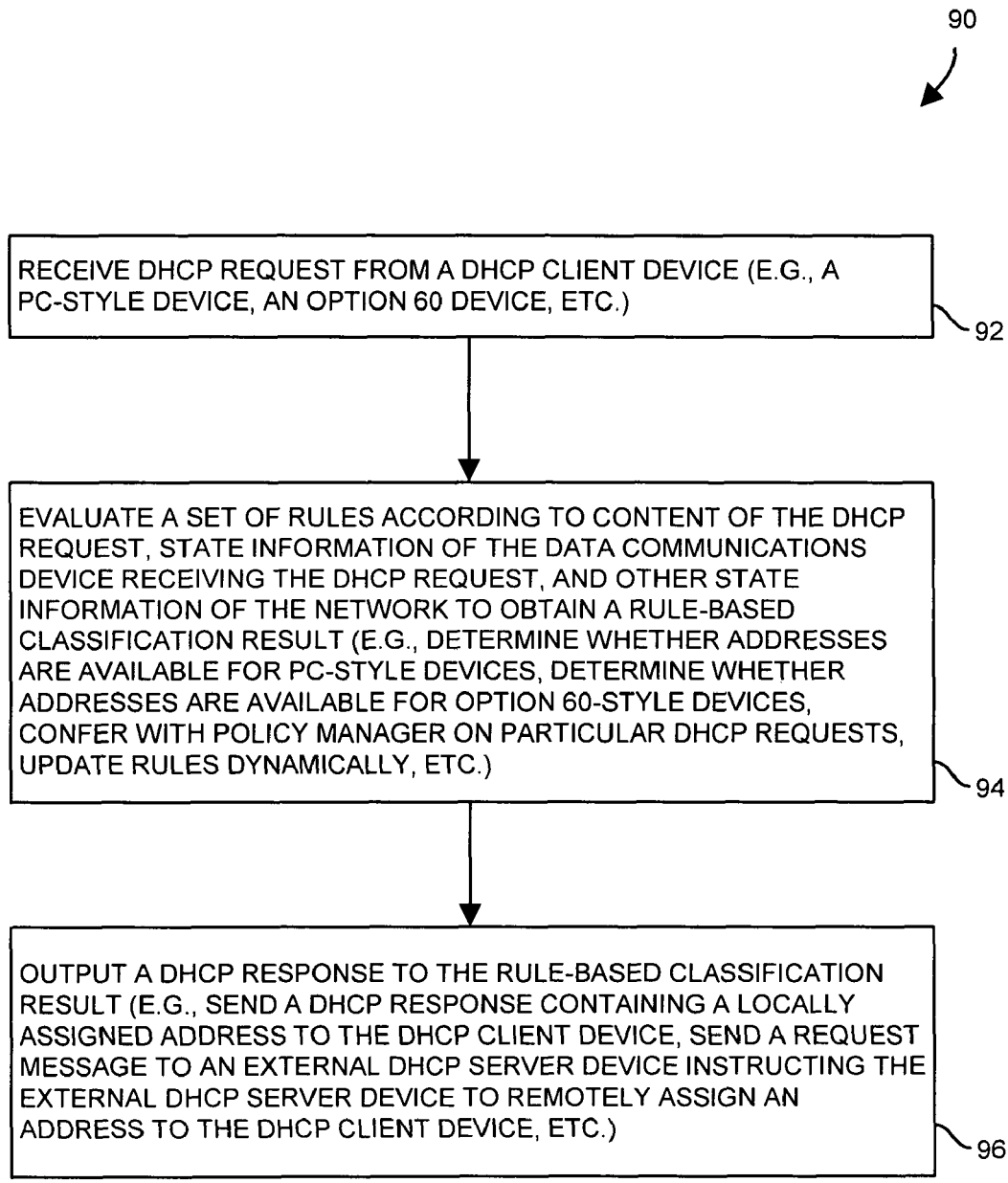
FIG. 4 is a flowchart of a procedure which is performed by the data communications device of FIG. 2.

FIG. 4 is a flowchart of a procedure 90 which is performed by the data communications device 22 when processing a DHCP request 42 from a DHCP client device 24. In step 92, the data communications device 22 receives the DHCP request 42 from the DHCP client device 24 through the communications media 30. As described above, the DHCP client devices 24 typically broadcast the DHCP requests 42 and the network interface 32 of the data communications device 22 is configured to obtain and convey such requests 42 to the controller 34 of the data communications device 22 (FIG. 1).

In step 94, the classifier stage 62 of the data communications device 22 evaluates the set of rules 36 in response to the DHCP request 42 to obtain a rule-based classification result 70. In particular, the classifier stage 62 analyzes the set of rules 36 according to content of the DHCP request 42, state information relating to the data communications device 22, and other information relating to the system 20 (e.g., network information). Recall that the rules 36 under evaluation are defined by the rule entries 82 of the table 80 (FIG. 3). For example, entry 82(1) defines a rule for DHCP requests 42 from PC-style devices under a condition in which the local POOL_A of the data communications device 22 has IP addresses available for assignment.

In step 96, the processing stage 64 outputs a DHCP response in response to the rule-based classification result 70. In particular, if the rule-based classification result 70 dictates that the local DHCP server circuitry 66 is to handle the address assignment, the local DHCP server circuitry 66 of the processing stage 64 outputs a DHCP response 44 containing the assigned address back to the DHCP client device 24. Alternatively, if the rule-based classification result 70 dictates that the DHCP relay agent circuitry 68 is to forward the DHCP request 42 to the external DHCP server device 26, the DHCP relay agent circuitry 68 sends a request message to the external DHCP server device 26 directing the external DHCP server device 26 to assign an IP address to the DHCP client device 24. The address assigned by the external DHCP server device 26 is provided from the external DHCP server device 26 to the DHCP client device 24 through the communications media 30.

As mentioned above, embodiments of the present invention are directed to techniques for processing DHCP requests 42 which involve classifying the DHCP requests 42 based on a set of rules 36, and providing DHCP responses 46 and other actions based on such classification. Such processing (i) enables rule-based processing of DHCP requests 42 based on information in the DHCP messages and other state in the network and (ii) allows for dynamic changing of the rules 36 for improved address management and control.

While this invention has been particularly shown and described with references to preferred embodiments thereof, it will be understood by those skilled in the art that various changes in form and details may be made therein without departing from the spirit and scope of the invention as defined by the appended claims.

For example, it should be understood that only one external DHCP server 26 was shown in the system 20 by way of example only. Other numbers of DHCP servers 26 are suitable for use as well (e.g., two, three, etc.). Such DHCP servers communicate with the data communications device 22 through the communications media 30 and are themselves capable of performing rule-based evaluation and DHCP operations.

Additionally, the above-described rules 36 may be applied to any client device, not just those that are predefined in a table of assignments. Accordingly, new clients can be managed correctly without requiring any updates to the rules configured in the network devices.

What is claimed is:

1. A data communications device, comprising:
  a network interface; and
  a controller coupled to the network interface, the controller being configured to process a Dynamic Host Configuration Protocol (DHCP) request from a DHCP client device by:
    receiving the DHCP request from the DHCP client device through the network interface,
    evaluating a set of rules in response to the DHCP request to obtain a rule-based classification result,
    outputting a DHCP response in response to the rule-based classification result, and
    causing other actions to be taken by other components of the network in response to the DHCP response, wherein the controller, when causing the other actions to be taken by the other components of the network, is configured to:
      effectuate assignment of an Internet Protocol (IP) address to the DHCP client device and delivery of the IP address from the data communications device to the DHCP client device in response to the DHCP request from the DHCP client device;
    wherein the set of rules is configured as a table having multiple rule entries, each rule entry defining (i) a particular condition, (ii) a pool name, (iii) a pool location, and (iv) an action;
    wherein the controller is further configured to:
      modify the set of rules dynamically while the data communications device of the network classifies other DHCP requests and outputs other DHCP responses; and
    wherein the controller, when modifying the set of rules, is configured to:
      change at least one of the particular condition, the pool name, the pool location, and the action of a rule entry substantially contemporaneously while the data communications device of the network classifies the other DHCP requests and outputs the other DHCP responses.

2. A data communications device as in claim 1 wherein the controller includes:
  a classifier stage configured to generate the rule-based classification result according to (i) a contents of the DHCP request and (ii) state information of the data communications device; and
  a processing stage coupled to the classifier stage, the processing stage having (i) DHCP server circuitry configured to send, as the DHCP response, a DHCP reply to the DHCP client device when the rule-based classification result has a first value, and (ii) DHCP relay agent circuitry configured to forward, as the DHCP response, a request message to a DHCP server device to enable the DHCP server device to provide a DHCP server communication in response to the request message when the rule-based classification result has a second value that is different than the first value.

3. A data communications device as in claim 2 wherein the DHCP server device is external to the data communications device and physically separated from the data communications device by at least one network hop.

4. A data communications device as in claim 2 wherein:
  evaluating the set of rules in response to the DHCP request to obtain the rule-based classification result includes:
    setting the rule-based classification result to be HANDLE_LOCALLY if a local pool of IP addresses contains an available IP address; and
    setting the rule-based classification result to be HANDLE_REMOTELY if the local pool of IP addresses does not contain an available IP address;
  the first value is HANDLE_LOCALLY; and
  the second value is HANDLE_REMOTELY.

5. A data communications device as in claim 1 wherein the controller, when outputting the DHCP response in response to the rule-based classification result, is configured to:
  send, as the DHCP response, a DHCP reply to the DHCP client device when the rule-based classification result has a first value; and
  forward, as the DHCP response, a request message to a DHCP server device to enable the DHCP server device to provide a DHCP server communication in response to the request message when the rule-based classification result has a second value that is different than the first value.

6. A data communications device as in claim 5 wherein the DHCP server communication is an answer message provided by the DHCP server device to the data communications device in response to the request message; and wherein the controller is further configured to:
  receive the answer message from the DHCP server device; and
  send a DHCP reply to the DHCP client device in response to the answer message from the DHCP server device.

7. A data communications device as in claim 5 wherein the controller, when evaluating the set of rules in response to the DHCP request to obtain the rule based classification result, is configured to:
  send a decision request signal to a policy manager, the decision request signal being configured to request a DHCP decision; and
  receive a decision answer signal from the policy manager in response to the decision request signal, the decision answer signal being the rule-based classification result.

8. A data communications device as in claim 7 wherein the policy manager resides within the data communications device of the network; and
  wherein the controller, when sending the decision request signal to the policy manager, is configured to:

transmit the decision request signal to the policy manager residing within the data communications device of the network.

9. A data communications device as in claim 7 wherein the policy manager is external to the data communications device of the network; and wherein the controller, when sending the decision request signal to the policy manager, is configured to:
transmit the decision request signal from the data communications device to the policy manager through at least one network hop.

10. A data communications device as in claim 5 wherein:
evaluating the set of rules in response to the DHCP request to obtain the rule-based classification result includes:
setting the rule-based classification result to be HANDLE_LOCALLY if a local pool of IP addresses contains an available IP address; and
setting the rule-based classification result to be HANDLE_REMOTELY if the local pool of IP addresses does not contain an available IP address;
the first value is HANDLE_LOCALLY; and
the second value is HANDLE_REMOTELY.

11. A data communications device as in claim 1 wherein the pool location defined by each rule entry identifies a DHCP server that manages a pool identified by the pool name defined by that rule entry.

12. In a data communications device of a network, a method of processing a Dynamic Host Configuration Protocol (DHCP) request from a DHCP client device, the method comprising:
receiving the DHCP request from the DHCP client device;
evaluating a set of rules in response to the DHCP request to obtain a rule based classification result;
outputting a DHCP response in response to the rule-based classification result; and
causing other actions to be taken by other components of the network in response to the DHCP response, wherein causing the other actions to be taken by the other components of the network includes:
effectuating assignment of an Internet Protocol (IP) address to the DHCP client device, and
delivery of the IP address from the data communications device to the DHCP client device in response to the DHCP request from the DHCP client device;
wherein the set of rules is configured as a table having multiple rule entries, each rule entry defining (i) a particular condition, (ii) a pool name, (iii) a pool location, and (iv) an action;
wherein the method further comprises:
modifying the set of rules dynamically while the data communications device of the network classifies other DHCP requests and outputs other DHCP responses;
wherein modifying the set of rules includes:
changing at least one of the particular condition, the pool name, the pool location, and the action of a rule entry substantially contemporaneously while the data communications device of the network classifies the other DHCP requests and outputs the other DHCP responses.

13. A method as in claim 12 wherein outputting the DHCP response in response to the rule-based classification result includes:
sending, as the DHCP response, a DHCP reply to the DHCP client device when the rule-based classification result has a first value; and
forwarding, as the DHCP response, a request message to a DHCP server device to enable the DHCP server device to provide a DHCP server communication in response to the request message when the rule-based classification result has a second value that is different than the first value.

14. A method as in claim 13 wherein the DHCP server communication is an answer message provided by the DHCP server device to the data communications device in response to the request message; and wherein the method further comprises:
receiving the answer message from the DHCP server device; and
sending a DHCP reply to the DHCP client device in response to the answer message from the DHCP server device.

15. A method as in claim 13 wherein evaluating the set of rules in response to the DHCP request to obtain the rule-based classification result includes:
sending a decision request signal to a policy manager, the decision request signal being configured to request a DHCP decision; and
receiving a decision answer signal from the policy manager in response to the decision request signal, the decision answer signal being the rule-based classification result.

16. A method as in claim 15 wherein the policy manager resides within the data communications device of the network; and wherein sending the decision request signal to the policy manager includes:
transmitting the decision request signal to the policy manager residing within the data communications device of the network.

17. A method as in claim 15 wherein the policy manager is external to the data communications device of the network; and wherein sending the decision request signal to the policy manager includes:
transmitting the decision request signal from the data communications device to the policy manager through at least one network hop.

18. A method as in claim 13 wherein:
evaluating the set of rules in response to the DHCP request to obtain the rule-based classification result includes:
setting the rule-based classification result to be HANDLE_LOCALLY if a local pool of IP addresses contains an available IP address; and
setting the rule-based classification result to be HANDLE_REMOTELY if the local pool of IP addresses does not contain an available IP address;
the first value is HANDLE_LOCALLY; and
the second value is HANDLE_REMOTELY.

19. A method as in claim 12 wherein the pool location defined by each rule entry identifies a DHCP server that manages a pool identified by the pool name defined by that rule entry.

20. In a data communications device of a network, a method of processing a Dynamic Host Configuration Protocol (DHCP) request for a network address from a DHCP client device, the method comprising:
receiving the DHCP request from the DHCP client device;
evaluating a set of rules in response to the DHCP request to obtain a rule based classification result, the set of rules being configured as a table having multiple rule entries, each rule entry defining (i) a particular condition, (ii) a pool name, (iii) a pool location, and (iv) an action; and
sending a DHCP response to the DHCP client device with an assignment of a network address, the network address being drawn from a pool defined by the pool name of a rule entry whose particular condition is satisfied;
wherein:
the particular condition includes a determination that a network address is not available within the pool on the data communications device; and
the method further includes forwarding the DHCP request to a separate network device for remote assignment of the network address from the pool;
wherein the method further comprises:
modifying the set of rules dynamically while the data communications device of the network classifies other DHCP requests and outputs other DHCP responses;
wherein modifying the set of rules includes:
changing at least one of the particular condition, the pool name, the pool location, and the action of a rule entry substantially contemporaneously while the data communications device of the network classifies the other DHCP requests and outputs the other DHCP responses.

21. A method as in claim 20 wherein the pool location defined by each rule entry identifies a DHCP server that manages a pool identified by the pool name defined by that rule entry.

* * * * *